US007841538B2

(12) United States Patent
Robertson et al.

(10) Patent No.: US 7,841,538 B2
(45) Date of Patent: Nov. 30, 2010

(54) TRANSACTION PRODUCT WITH MEMORY

(75) Inventors: Travis M. Robertson, Minnetonka, MN (US); Adam W. Reynolds, Minneapolis, MN (US); Ted C. Halbur, Lino Lakes, MN (US); Timothy P. Clegg, Manhatten Beach, CA (US); Primoz Samardzija, Marina del Rey, CA (US)

(73) Assignee: Target Brands, Inc., Minneapolis, MN (US)

( * ) Notice: Subject to any disclaimer, the term of this patent is extended or adjusted under 35 U.S.C. 154(b) by 457 days.

(21) Appl. No.: 11/931,696

(22) Filed: Oct. 31, 2007

(65) Prior Publication Data

US 2009/0112761 A1 Apr. 30, 2009

(51) Int. Cl.
 *G06K 19/06* (2006.01)
(52) U.S. Cl. ................. 235/492; 235/380; 235/487
(58) Field of Classification Search .......... 235/492, 235/380, 487, 441, 451
 See application file for complete search history.

(56) References Cited

U.S. PATENT DOCUMENTS

| 3,598,986 | A | 8/1971 | Love |
| 4,055,014 | A | 10/1977 | Schmidt et al. |
| D285,121 | S | 8/1986 | Schwartz |
| 4,791,741 | A | 12/1988 | Kondo |
| D301,716 | S | 6/1989 | Ohzu |
| D302,014 | S | 7/1989 | Ohzu |
| D305,887 | S | 2/1990 | Nishimura |
| 4,959,035 | A | 9/1990 | Murasaki |
| D314,574 | S | 2/1991 | Kato |
| D316,550 | S | 4/1991 | Sogabe |
| 5,247,293 | A | 9/1993 | Nakagawa |
| 5,387,108 | A | 2/1995 | Crowell |
| 5,539,819 | A | 7/1996 | Sonoyama et al. |
| 5,563,400 | A | 10/1996 | LeRoux |
| 5,577,918 | A | 11/1996 | Crowell |
| 5,845,425 | A | 12/1998 | Leake et al. |
| 5,982,736 | A | 11/1999 | Pierson |
| 6,016,298 | A | 1/2000 | Fischer |

(Continued)

FOREIGN PATENT DOCUMENTS

GB 2277482 A 11/1994

(Continued)

OTHER PUBLICATIONS

"Custom MP3 Player with USB Flash Memory Style BX," http://www.memorysuppliers.com/cump3plwiusb1.html, printed on Jun. 20, 2006, 6 pages.

(Continued)

*Primary Examiner*—Edwyn Labaze
(74) *Attorney, Agent, or Firm*—Griffiths & Seaton PLLC

(57) ABSTRACT

A transaction product includes a memory, a housing, an electrical connector and an account identifier. The housing encloses the memory. The electrical connector is securely electrically coupled with the memory and is configured to be selectively received by a socket of a computing device such that the computing device can access the memory via the electrical connector. The account identifier links the transaction product to an account or record, the account identifier being machine readable by a point-of-sale terminal such that value can be added to or deducted from the account or record using the account identifier. Other product, cards, assemblies and associated methods are also disclosed.

29 Claims, 12 Drawing Sheets

U.S. PATENT DOCUMENTS

| | | | |
|---|---|---|---|
| 6,028,752 | A | 2/2000 | Chomette et al. |
| 6,078,557 | A | 6/2000 | Pierson |
| 6,078,559 | A | 6/2000 | Takemura et al. |
| D429,733 | S | 8/2000 | Jones et al. |
| D436,991 | S | 1/2001 | Morgante |
| 6,304,544 | B1 | 10/2001 | Pierson et al. |
| 6,356,626 | B1 | 3/2002 | Ohara et al. |
| 6,386,457 | B1 | 5/2002 | Sorie |
| 6,400,675 | B1 | 6/2002 | Everidge et al. |
| 6,402,039 | B1 | 6/2002 | Freeman et al. |
| 6,510,124 | B1 | 1/2003 | Wood |
| 6,561,420 | B1 | 5/2003 | Tsai et al. |
| 6,575,835 | B1 | 6/2003 | Mishina et al. |
| 6,666,378 | B2 | 12/2003 | Davila et al. |
| 6,684,197 | B1 | 1/2004 | Kolls |
| 6,715,795 | B2 | 4/2004 | Klure |
| 6,749,114 | B2 | 6/2004 | Madani |
| 6,762,583 | B2 | 7/2004 | Ho et al. |
| 6,762,988 | B2 | 7/2004 | Wood |
| D494,999 | S | 8/2004 | Cook, Jr. |
| 6,774,795 | B2 | 8/2004 | Eshelman et al. |
| 6,832,730 | B2 | 12/2004 | Conner et al. |
| D502,469 | S | 3/2005 | Pierson |
| D502,694 | S | 3/2005 | Chang |
| D503,404 | S | 3/2005 | Wood |
| 6,910,627 | B1 | 6/2005 | Simpson-Young et al. |
| D511,519 | S | 11/2005 | Bone et al. |
| 6,979,210 | B2 | 12/2005 | Regen et al. |
| D513,869 | S | 1/2006 | Hunter, Jr. et al. |
| D520,015 | S | 5/2006 | Peddle |
| D522,518 | S | 6/2006 | Loftus |
| D522,519 | S | 6/2006 | Rubin et al. |
| 7,055,740 | B1 | 6/2006 | Schultz et al. |
| 7,252,225 | B2 | 8/2007 | Schultz et al. |
| 2001/0053076 | A1 | 12/2001 | Chien |
| 2002/0017759 | A1 | 2/2002 | McClung, III et al. |
| 2002/0019776 | A1 | 2/2002 | Simpson |
| 2002/0066789 | A1 | 6/2002 | Yen |
| 2002/0080714 | A1 | 6/2002 | Pierson et al. |
| 2002/0112250 | A1 | 8/2002 | Koplar et al. |
| 2002/0131359 | A1 | 9/2002 | Wood |
| 2002/0143697 | A1 | 10/2002 | Gotfried |
| 2002/0169608 | A1 | 11/2002 | Tamir et al. |
| 2003/0004889 | A1 | 1/2003 | Fiala et al. |
| 2003/0022586 | A1 | 1/2003 | Beged-Dov |
| 2003/0132300 | A1 | 7/2003 | Dilday et al. |
| 2003/0155425 | A1 | 8/2003 | Lynch |
| 2003/0218064 | A1 | 11/2003 | Conner et al. |
| 2004/0028235 | A1 | 2/2004 | Pan |
| 2004/0046035 | A1 | 3/2004 | Davila et al. |
| 2004/0055188 | A1 | 3/2004 | Dolan-King |
| 2004/0064364 | A1 | 4/2004 | Toyooka |
| 2004/0075573 | A1 | 4/2004 | Beadman et al. |
| 2004/0177002 | A1 | 9/2004 | Abelow |
| 2004/0182940 | A1 | 9/2004 | Biller |
| 2004/0226032 | A1 | 11/2004 | Wood |
| 2004/0238625 | A1 | 12/2004 | Walker et al. |
| 2004/0246704 | A1 | 12/2004 | Burdick |
| 2005/0109841 | A1 | 5/2005 | Ryan et al. |
| 2005/0143142 | A1 | 6/2005 | Bang et al. |
| 2005/0184164 | A1 | 8/2005 | deJong |
| 2005/0194454 | A1* | 9/2005 | Ferber et al. ............... 235/492 |
| 2005/0230484 | A1 | 10/2005 | Cuellar et al. |
| 2005/0236490 | A1 | 10/2005 | Fortune et al. |
| 2006/0022055 | A1 | 2/2006 | Brewer et al. |
| 2006/0038023 | A1 | 2/2006 | Brewer et al. |
| 2006/0065748 | A1 | 3/2006 | Halbur et al. |
| 2006/0077684 | A1 | 4/2006 | Yuen |
| 2006/0157555 | A1 | 7/2006 | Dean et al. |
| 2006/0157556 | A1 | 7/2006 | Halbur et al. |
| 2006/0161439 | A1 | 7/2006 | Selg et al. |
| 2006/0289657 | A1 | 12/2006 | Rosenberg |
| 2007/0016941 | A1* | 1/2007 | Gonzalez et al. ............... 726/9 |
| 2007/0252010 | A1* | 11/2007 | Gonzalez et al. ............ 235/492 |
| 2008/0119952 | A1 | 5/2008 | Smith et al. |
| 2008/0221714 | A1 | 9/2008 | Schoettle |
| 2009/0099674 | A1 | 4/2009 | Smith et al. |

FOREIGN PATENT DOCUMENTS

| | | |
|---|---|---|
| GB | 2331959 | 6/1999 |
| WO | 9900765 | 1/1999 |

OTHER PUBLICATIONS

"PNY Attache Executive USB Pen Flash Drives," http://www.memorysuppliers.com/pnyatusbpenf.html, printed on Jun. 20, 2006, 3 pages.

"USB Flash Card Disk—Solar Calculator Optional," http://www.memorysuppliers.com/usbfldica.html, printed on Jun. 20, 2006, 4 pages.

"Kids Talk Radio," http://www.kidstalkradiola.com, printed on Oct. 12, 2007, 14 pages.

Smith et al., "Financial Transaction Product with Media Player," U.S. Appl. No. 11/604,016, filed Nov. 22, 2006.

"Best Buy CD Cardz," http://www.serious.com/projBestBuy, Nov. 9, 2004, 2 pages.

"Circuit City Gift Card with Packaging," available in Circuit City retail stores at least as early as Dec. 5, 2005, 2 pages.

"Credit Union Tech Talk," http://www.cunews.com/newsletters/2004419.htm, Apr. 19, 2004, 8 pages.

"EFT Direct, MonetaOne Multimedia Gift Card," http://web.archive.org/web/20020808051140/http://www.eft-direct.com/multimedia.html, Aug. 8, 2002, 4 pages.

Hershman, Tania, "An Israeli flash drive in every wallet," http://www.israel21c.org/bin/en.jsp?enDispWho=Article...view&enDispWhat=object&enVersion=0&enZone=Technology&, Apr. 16, 2006, 3 pages.

Michigan Technology News, Xenaga Offers DC Gift Card; Could close Deal with NASCAR, http://64.233.167.104/search?q=cache:ax1L0PJ_16oJ:www.mitechnews.com/technews/entr..., Mar. 12, 2003, 4 pages.

"Mimoco," http://www.web.archive.org/web/20060702151311/http://www.mimoco.com/bunch.htm, availble at least as early as Feb. 2006 per the Internet Archive available at www.archive.org, 1 page.

"Mimoco FAQ," http://www.web.archive.org/web/20060720204522/http://www.mimoco.com/faq.shtml, availble at least as early as Jul. 2006 per the Internet Archive available at www.archive.org, 3 pages.

OHGIZMO! "Card Drive U510, 16 GB in Your Wallet," http://www.ohgizmo.com/2006/04/26/card-drive-u510-16gb-in-your-wallet, Apr. 26, 2006, 2 pages.

"One28 Marketing Group, LLC Introduces First Multimedia Gift Card™ on the Market," http://www.one28marketing.com/pressrelease/june_15_2004.html, Jun. 15, 2004, 3 pages.

Lasky, Michael, "Credit Card-Size Hard Drive Can Hold 5GB-Cheap, thin, flexible StorCard expected to become available this year," http://www.pcworld.com/resource/printable/article/0,aid,108816,00.asp, Jan. 16, 2003, 2 pages.

"PQI Releases Credit Card Sized U510 USB Storage Device," http://www.picturecorrect.com/articles/pqi_u510_card_size_memory_review.htm, printed on Jun. 20, 2006, 2 pages.

"PQI releases a 3mm thick credit card size card drive U510 holding 16GB in capacity," http://www.pqi.com.tw/news_1.asp?ID=1078, May 16, 2006, 2 pages.

Barbaro, Michael, "Pushing the Envelope-Retailers Design Gift Cards to Pack More Presence," http://www.washingtonpost.com/ac2/wp-dyn/A34115-2004Dec3?language=printer, Dec. 4, 2004, 2 pages.

"Walletex launches into the U.S. Market with Wallet Flash™," http://www.walletex.com/filemanager/general/page_49/Walletex-launches-Wallet-Flash-the-slimmest-USB-Flash-Drive-in-a-credit-card-size-body.pdf, Dec. 12, 2005, 2 pages.

"Wallet Flash, Wallet Friendly Advertising," http://www.walletex.com//filemanager/general/page_3/Walletex-Wallet-Flash-brochure-see-the-1st-credit-card-sized-USB-Flash-Drive-140107.pdf, printed on Sep. 17, 2007, 2 pages.

The X-Card, http://www.archive.org/web/20040202033945/www.xenaga.com, available as early as Dec. 14, 2003 per the Internet Archive available at www.archive.org, 4 pages.

* cited by examiner

Fig. 5
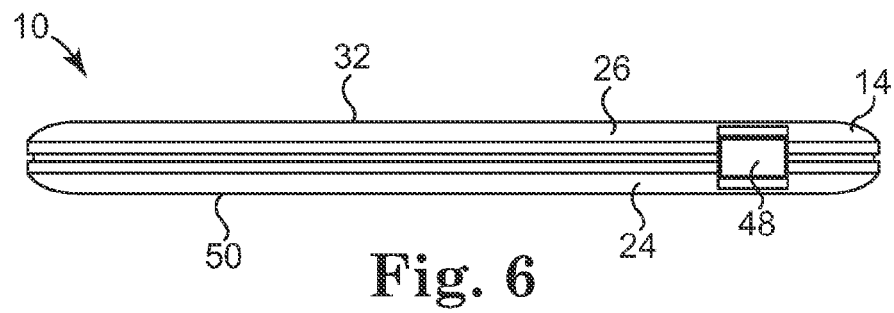
Fig. 6
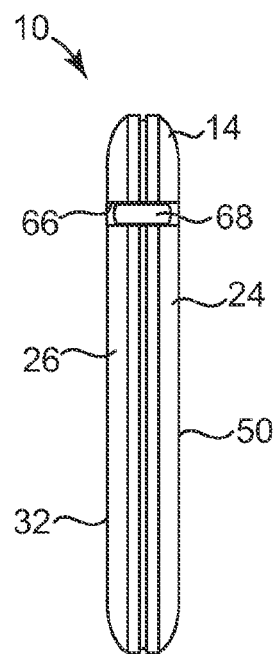 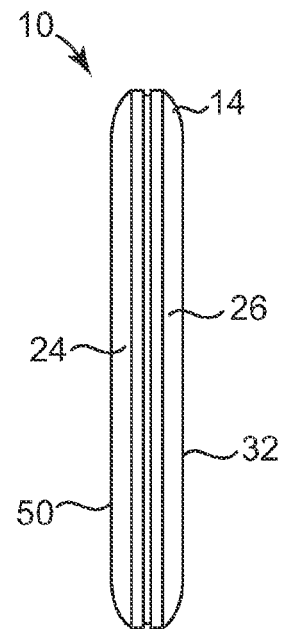
Fig. 7　　　　Fig. 8

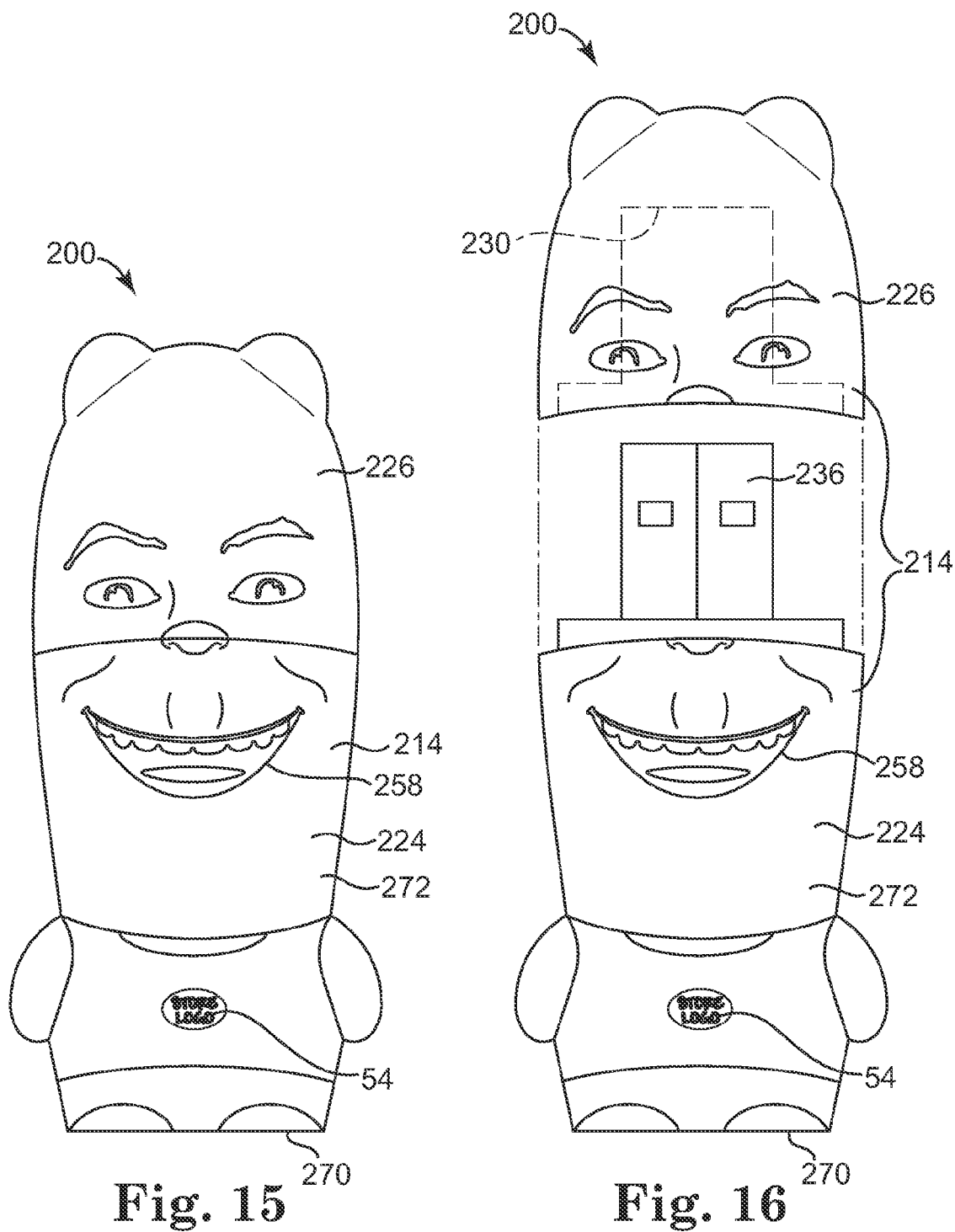

TRANSACTION PRODUCT WITH MEMORY

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY OF THE INVENTION

One aspect of the present invention relates to a transaction product including a memory, a housing, an electrical connector and an account identifier. The housing encloses the memory. The electrical connector is securely electrically coupled with the memory and is configured to be selectively received by a socket of a computing device such that the computing device can access the memory via the electrical connector. The account identifier links the transaction product to an account or record, the account identifier being machine readable by a point-of-sale terminal such that value can be added to or deducted from the account or record using the account identifier. Other related products, assemblies and methods are also disclosed and provide additional advantages.

BRIEF DESCRIPTION OF THE DRAWINGS

Embodiments of the invention will be described with respect to the figures, in which like reference numerals denote like elements, and in which:

FIG. 5 is a top view illustrating the transaction product of FIG. 1.

FIG. 6 is a bottom view illustrating the transaction product of FIG. 1.

FIG. 7 is a right side view illustrating the transaction product of FIG. 1.

FIG. 8 is a left side view illustrating the transaction product of FIG. 1.

FIG. 15 is a front view illustrating a transaction product in a storage position, according to one embodiment of the present invention.

FIG. 16 is a front view illustrating the transaction product of FIG. 1 in a use position, according to one embodiment of the present invention.

DETAILED DESCRIPTION

A flash drive gift card and other transaction products are adapted for making purchases of goods and/or services at, for example, a retail store or website and/or for storing non-monetary value adapted for redemption toward the use of goods and/or services (e.g., a phone card). According to one embodiment, an original consumer buys a flash drive gift card to give a recipient who in turn is able to use the flash drive gift card at a retail store or setting to pay for the goods and/or services.

A flash drive gift card, according to embodiments of the present invention, provides the consumer and recipient with a data storage function in addition to the ability to pay for or use goods and/or services with the transaction product. In particular, in one embodiment, the flash drive gift card includes a flash drive or other solid state memory and any suitable connector (e.g., such as a universal serial bus (USB) connector) configured to be readily and selectively coupled with a personal computer or other suitable computing device. Once coupled with the flash drive gift card, the computing device can access the memory of the flash drive gift card and read data from and/or write data to the memory of the flash drive gift card. As such, transaction products (e.g., the flash drive gift card and other stored-value cards) according to embodiments of the present invention function as a portable memory device in addition to providing value available toward the purchase or use of goods and/or services.

Turning to the figures, FIGS. 1-8 illustrate a transaction product 10 such as a stored-value card or financial transaction card according to one embodiment of the present invention. Transaction product 10 is linked with an account or record and provides means for accessing the monetary funds or non-monetary funds (e.g., prepaid calling minutes or points) associated with the account or record for paying for goods and/or services, for use toward calling minutes, for use of points toward a purchase, etc. In addition, transaction product 10 functions as a removable memory drive selectively couplable to and accessible with a corresponding computing device 12 (FIG. 2) such as a personal computer (e.g., a desktop computer, laptop or notebook computer, personal digital assistant, portable computers, wearable computers and cell phones).

Figure 1:
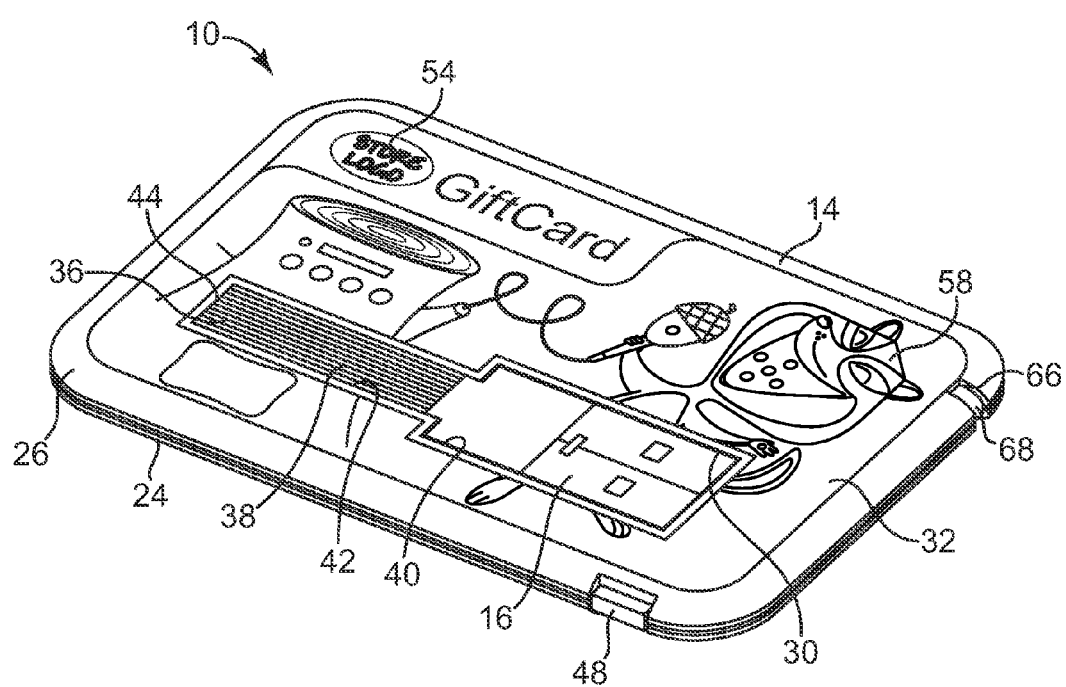
FIG. 1 is a perspective view illustrating a transaction product, according to one embodiment of the present invention.
Figure 2:
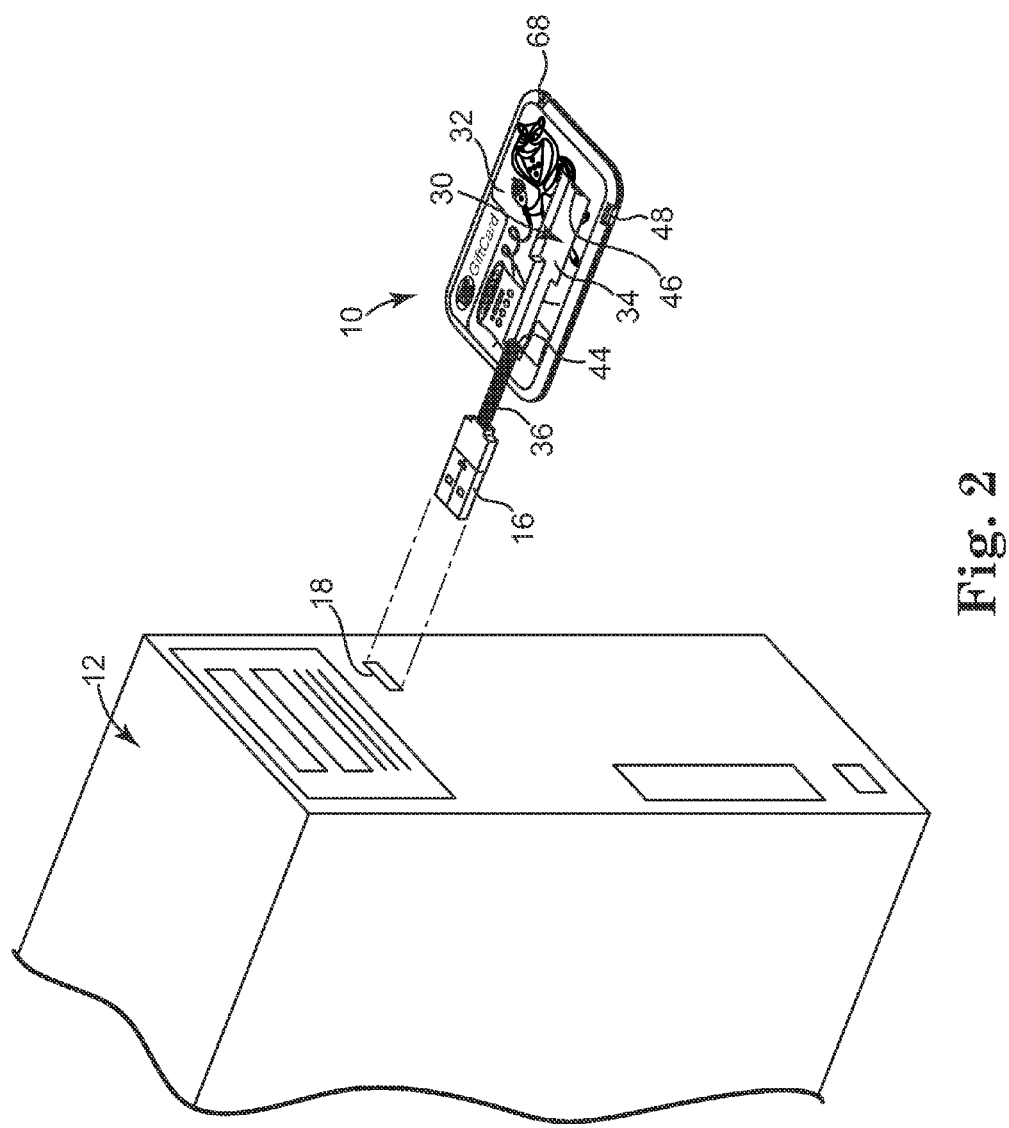
FIG. 2 is a perspective view illustrating the transaction product of FIG. 1 and a computing device, according to one embodiment of the present invention.
Figure 3:
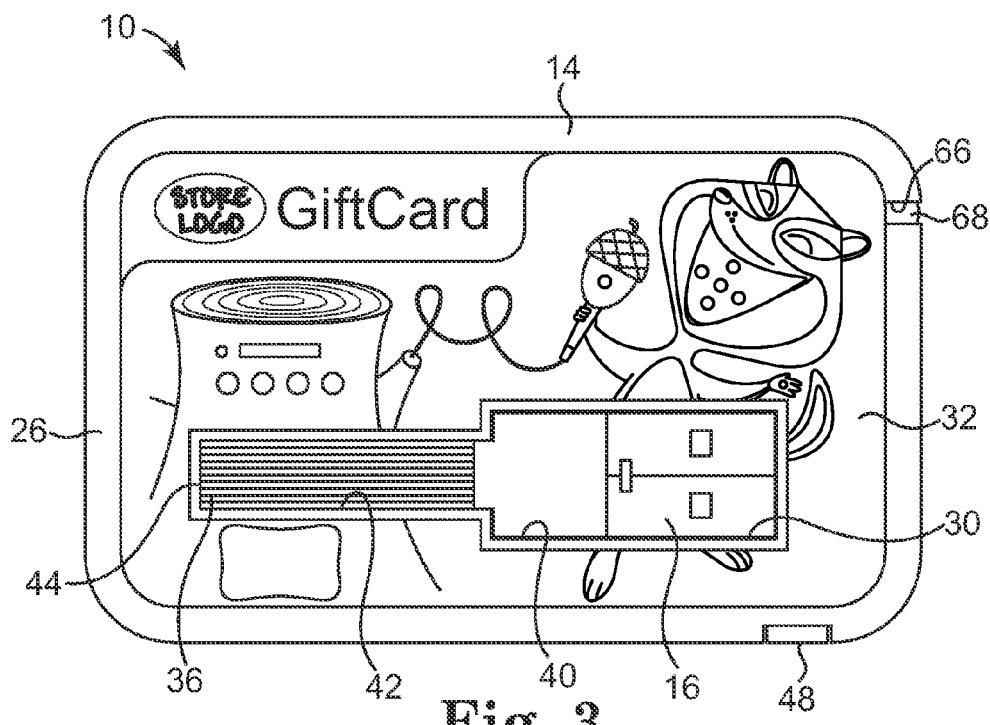
FIG. 3 is a front view illustrating the transaction product of FIG. 1.

In one embodiment, transaction product 10 includes an enclosure or housing 14 and an electrical connector 16 configured move from a first position at least partially embedded in housing 14 (FIGS. 1, 3-8) and a second position extending away from housing 14 (FIG. 2). Referring to FIG. 2, electrical connector 16 is configured to be selectively coupled with computing device 12 via a socket 18 defined by computing device 12. Transaction product 10 interfaces with computing device 12 via electrical connector 16 and socket 18 to provide computing device 12 with access to data and/or available memory space within transaction product 10.

Figure 9:
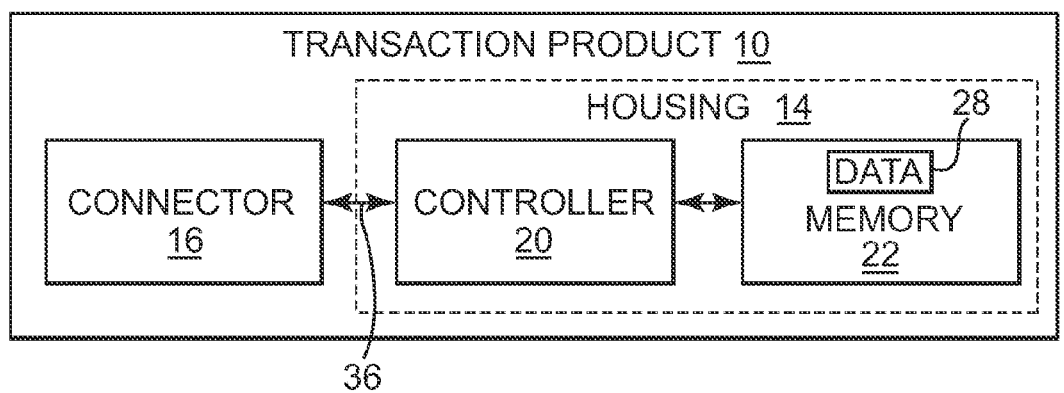
FIG. 9 is a block diagram illustrating a transaction product, according to one embodiment of the present invention.

Additionally referring to the block diagram of FIG. 9, in one example, transaction product 10 generally includes electrical connector 16, controller 20 and memory 22. Electrical connector 16 is any suitable connector corresponding with socket 18. In one embodiment, electrical connector 16 is a standardized connector, for example, a universal serial bus (USB) type connector such as an A-type, B-type or mini-type USB connector. In general, in one embodiment, the type of electrical connector 16 is selected for compatibility with a particular type of socket 18 common for a particular type of computing device 12 with which transaction product 10 is configured for use. For example, where computing device 12 is a desktop or laptop computer, electrical connector 16 is an A-type USB connector; where computing device 12 is a printer, electrical connector 16 is a B-type USB connector; and where computing device 12 is a MP3 player or digital camera, electrical connector 16 is a mini-type USB connector. However, other combinations of types of electrical connectors 16 and devices are also contemplated such as an A-type USB connector for interfacing with a personal computer. In view of the above, electrical connector 16 is one example of means for selectively coupling transaction product 10 with computing device 12.

Electrical connector 16 is securely and electrically coupled with controller 20. In one embodiment, electrical connector 16 is permanently coupled with controller 20. Controller 20 is configured to communicate with computing device 12 via electrical connector 16 and to perform tasks at the direction of computing device 12. In one embodiment, controller 20 is additionally or alternatively powered by computing device 12 via power received from computing device 12 via electrical connector 16. Controller 20 is also coupled to and in electrical communication with memory 22. As such, controller 20 is configured to read data to and/or write data from memory 22 at the direction of computing device 12. In one embodiment, a communication link 36 such as cable(s) and/or wire(s) extends at least partially between controller 20 and electrical connector 16 to facilitate electrical connection and communication therebetween. In one example, a first portion of communication link 36 is enclosed within housing 14, and a second portion 38 of communication link 36 extends outside of housing 14 and interfaces with electrical connector 16.

Memory 22 is any suitable memory such as read-only memory (ROM) (e.g., programmable ROM (PROM), erasable PROM (EPROM) and electrically EPROM (EEPROM)) and read-write memory (RAM) (e.g., static RAM (SRAM) and dynamic RAM (DRAM). In one example, memory 22 is a solid state memory such as Flash memory or EEPROM, wherein memory 22 in the solid state form is generally characterized by the absence of moving or otherwise mechanical parts. Memory 22 can be configured to store any suitable amount of data depending upon the desired use and desired cost point of transaction product 10. In one embodiment, memory 22 is configured to store at least 64 Mb of data. In one example, memory 22 is pre-recorded with any suitable data 28 and/or includes available memory space for the bearer of transaction product 10 to record other data content thereto. In view of the above, memory 22 is one example of means for storing data.

In one embodiment, housing 14 encloses controller 20 and memory 22 therein. Housing 14 may be formed in any suitable construction such as single piece or multiple piece construction. In one example, housing 14 is generally planar and is sized similar to a credit card or other wallet-sized card. In other embodiments, housing 14 is otherwise shaped as a square, circle, oval, star or any other suitable shape. For example, in the embodiment illustrated in FIGS. 1-8, housing 14 is a two-piece housing including a first member or base 24 and a second member or cover 26 coupled to one another to enclose controller 20 and memory 22 (FIG. 9) therebetween.

In one example, housing defines an aperture 66, for example, along a side thereof through which a light 68 is viewable. Light 68 is any suitable light sources such as a light emitting diode (LED) and is configured to be illuminated whenever memory 22 is being accessed by a corresponding computing device 12. As such, the bearer of transaction product 10 is alerted that memory 22 is in use and transaction product 10 generally should not be uncoupled from computing device 12 while memory 22 is in use, that is, while light 68 is illuminated.

In one embodiment, base 24 and cover 26 are separately formed in any suitable manner and are coupled to one another using one or more of a friction fit coupling, adhesive, coupling members (not shown) or other suitable means for coupling base 24 to cover 26. In one example, each of base 24 and cover 26 are formed of by injection molding or otherwise forming plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of housing 14.

In one example, housing 14, for instance, cover 26 as illustrated in FIGS. 1-8, defines a recess or pocket 30 (e.g., FIG. 2) sized to selectively receive electrical connector 16. In on embodiment, pocket 30 is open to a major surface 32 (i.e., a first major external surface of housing 14) of cover 26 where major surface 32 is substantially planar. In one example, pocket 30 defines a major surface 34, which is substantially planar and extends generally parallel to major surface 32 of cover 26. In one example, pocket 30 is configured to selectively receive second portion 38 of communication link 36 along with electrical connector 16. In one embodiment, communication link 36 is at least somewhat pliable allowing the position of electrical connector 16 relative to housing 14 to be adjusted.

In view of the above, in one embodiment, electrical connector 16 and second portion 38 of communication link 36 are configured to be selectively received within pocket 30 of housing 14 during periods of non-use for storage. More specifically, electrical connector 16 is configured to be selectively maintained within pocket 30 via one or more of friction fit, snap fit or other suitable interface. As such, in one instance, pocket 30, or at least a first portion 40 thereof, is sized similarly to, but slightly larger than, electrical connector 16. In one embodiment, a second portion 42 of pocket 30 is sized similarly to, but slight larger than, second portion 38 of communication link 36 and is positioned adjacent first portion 40.

In one example, a hole or opening 44 is defined by housing 14 adjacent an end of second portion 42 of pocket 30 opposite first portion 40 such that communication link 36 extends out of housing 14 via opening 44. The pliable nature of communication link 36 allows communication link 36 to be rotated about opening 44 to extend further away from housing 14 during periods of use (e.g., FIG. 2) or to extend into pocket 30 for storage during periods of non-use (e.g., FIG. 1). As such, in one embodiment, while in the storage or second position, each of communication link 36 and electrical connector 16 are at least partially embedded within housing 14 via pocket 30.

When a user desires to access data previously stored to and/or to store new data to memory 22, electrical connector 16 is released from pocket 30 allowing electrical connector 16 and second portion 42 of communication link 36 to be moved away from housing 14 as illustrated in FIG. 2. In one embodiment, electrical connector 16 is held within pocket 30 with a hook 46 (generally indicated in FIG. 2) or other suitable device and a switch or other button 48 extends from housing. Button 48 is configured to be moved (e.g., slid, pressed or flipped) by a user in a manner causing hook 46 to release electrical connector 16 from within pocket 30. For example, in one instance, moving button 48 causes hook 46 to move out of pocket 30 and into housing 14 allowing electrical connector 16 to be placed within or removed from pocket 30. Upon release of button 48, hook 46 moves back into pocket 30 in a manner at least partially holding electrical connector 16 within pocket 30 when electrical connector 16 is positioned within pocket 30.

Upon release of electrical connector 16 from pocket 30, electrical connector 16 and second portion 42 of communication link 36 can be manipulated or otherwise moved relative to the remainder of housing 14. For example, as illustrated with respect to FIGS. 1 and 2, communication link 36 and electrical connector 16 move from a first or storage position (e.g., FIG. 1), in which second portion 38 of communication link 36 and electrical connector 16 are at least partially embedded within housing 14 (e.g., placed within pocket 30), to a second or use position (FIG. 2) in which communication link 36 extends away from housing 14 such that electrical connector 16 is spaced from housing 14 and is free to interface with socket 18 of computing device 12.

In one example, housing 14 includes text and/or other graphics on first major surface 32 thereof and/or on a second major surface 50 positioned opposite first major surface 32. For example, housing 14 includes one or more of brand indicia 54, redemption indicia, which is generally indicated by a dashed box at 56 in FIG. 4, and decorative indicia 58. Indicia 54, 56 and/or 58 may be applied to housing 14 in any suitable manner such as with printing, with a printed label, via integral formation with housing 14, etc.

Brand indicia 54 identify a brand associated with transaction product 10 such as identifying a product brand, a store brand or other indicia readily associated with a product or store etc. In one embodiment, brand indicia 54 are included on one or both of first major surface 32 and second major surface 50.

In one embodiment, housing 14 includes redemption indicia 56, which, in one example, are included on second major surface 50. Redemption indicia 56 indicate that transaction product 10 is redeemable for the purchase of goods and/or services and that, upon use, a value of the goods and/or services will be deducted from the account or record linked to transaction product 10. In one embodiment, redemption indicia 56 include phrases such as "<NAME OF STORE> Gift-Card" and "This GiftCard is redeemable for merchandise or services at any of our stores or at our web site," and/or provides help or phone line information in case of a lost, stolen or damaged transaction product, etc.

In one embodiment, decorative indicia 58 are included on one or both of first major surface 32 and second major surface 50. Decorative indicia 58 may include any suitable text or other graphics configured to increase the aesthetic appeal of transaction product 10 and/or to otherwise promote the sale of transaction product 10. In one embodiment, decorative indicia 58 include media product identifiers such as characters, scenery, titles, etc. relating to a media product such as a movie, book, television show, periodical, etc. In one example where decorative indicia 58 include media product identifiers, memory 22 includes data 28 stored thereto prior to offering transaction product 10 for sale wherein data 28 include one or more of a game, music, a video clip, a web site link, an associated product listing, etc. relating to the media product associated with the media product identifiers. As such, decorative indicia 58 not only promote sale of transaction product 10, but also promote the media product as well as the type of data 28 prerecorded to memory 22 of transaction product 10, if any. In view of the above, decorative indicia 58 are one example of means for visually associating transaction product 10 with a media product.

Figure 4:
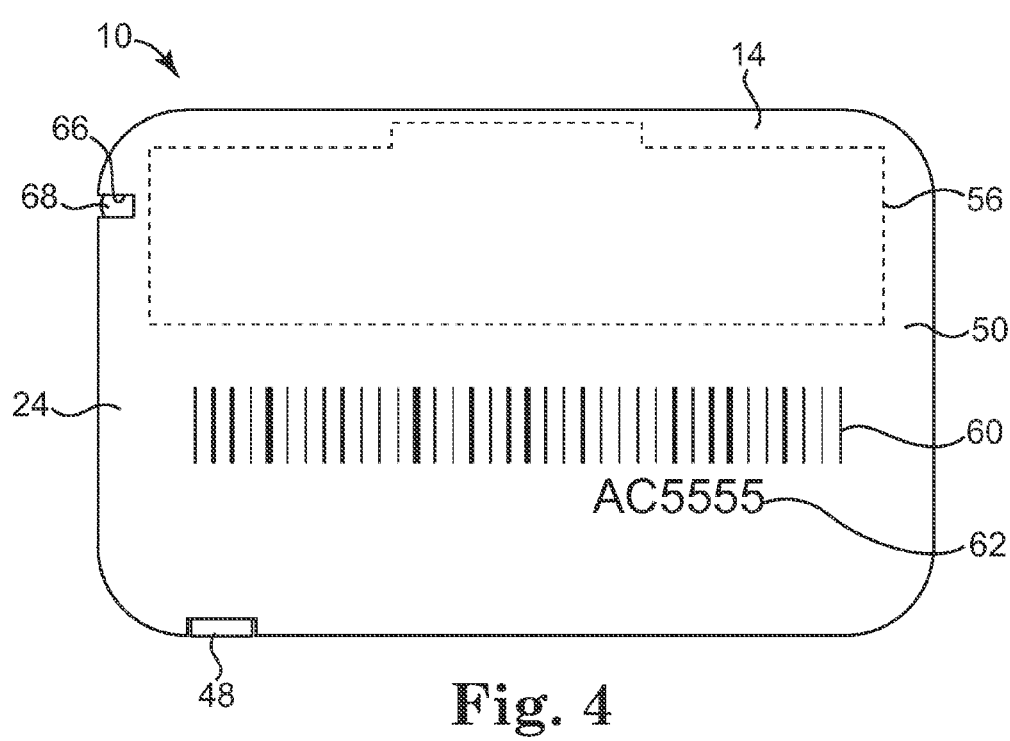
FIG. 4 is a rear view illustrating the transaction product of FIG. 1.

Referring to the rear view of FIG. 4, housing 14 includes at least one activation area or account identifier 60 indicating an account or record linked with transaction product 10, for example printed or otherwise applied to one of first major surface 32 and second major surface 50 of housing 14. Account identifier 60 indicates an account or record to which transaction product 10 is linked. The account or record maintains a monetary or non-monetary value or balance associated with transaction product 10 and is optionally stored on a database, other electronic or manual record-keeping system or in the case of "smart" cards for example, on a chip or other electronic device on transaction product 10 itself. Accordingly, by scanning or otherwise reading account identifier 60, the account or record linked to transaction product 10 is identified and can subsequently be activated and have amounts debited and/or added to the value associated therewith.

In one embodiment, account identifier 60 includes one or more of a bar code, magnetic strip, smart chip or other electronic device, radio frequency identification (RFID) device or other suitable marking readily readable by a point-of-sale terminal, account access station, kiosk or other suitable machine or device. In one embodiment, account identifier 60 includes a printed character string or code 62 (e.g., a number and or letter string) configured to provide additional security to the use of transaction product 10 and/or configured to be read by a bearer of transaction product 10 to facilitate use of transaction product 10 for web site or other purchases outside of a brick-and-mortar type retail establishments. With the above in mind, account identifier 60 is one example of means for linking transaction product 10 with an account or record, and scanning of account identifier 60 is one example of means for activating or loading value on transaction product 10.

Figure 10:
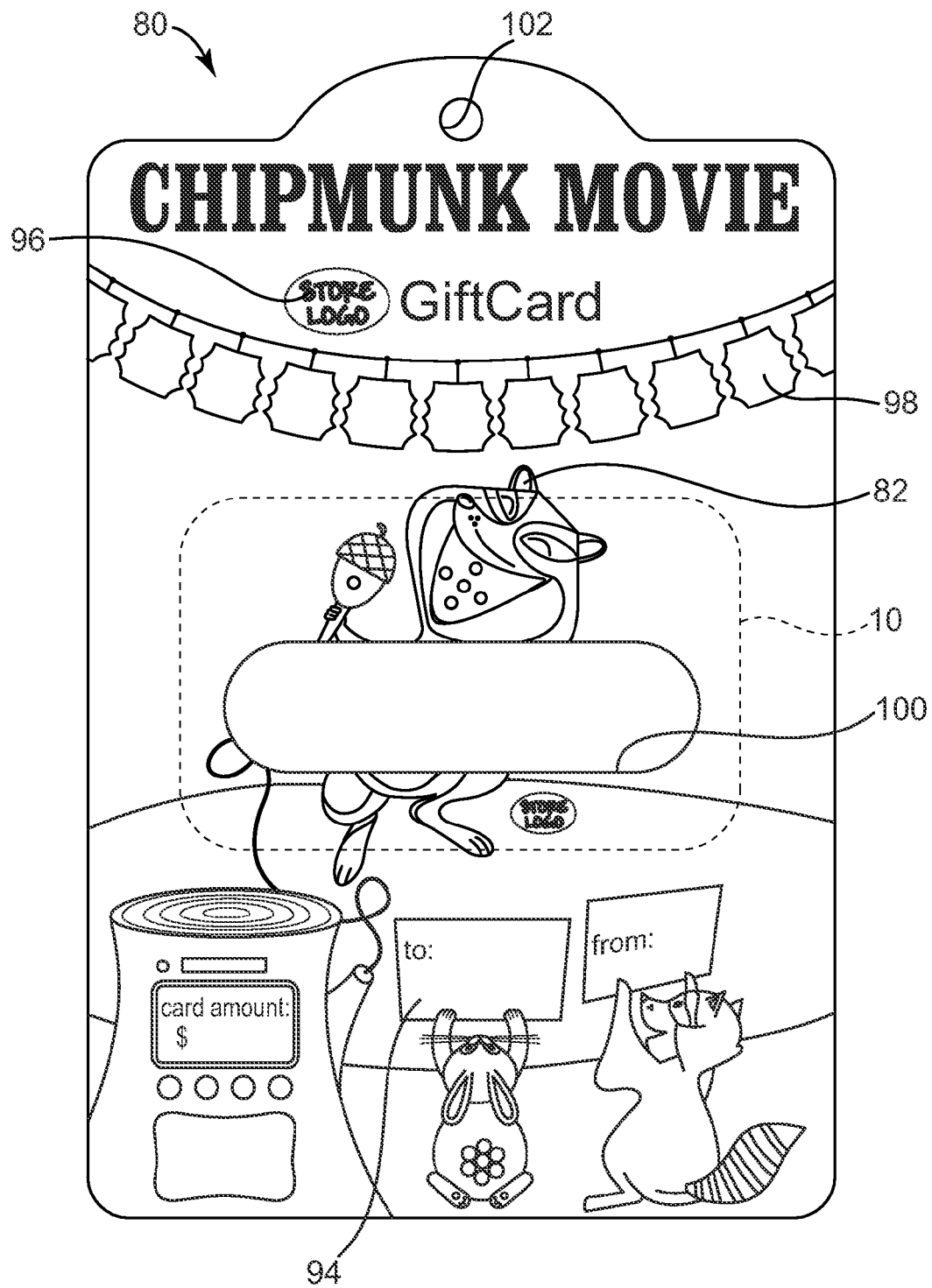
FIG. 10 is a front view illustrating a backer, according to one embodiment of the present invention.
Figure 11:
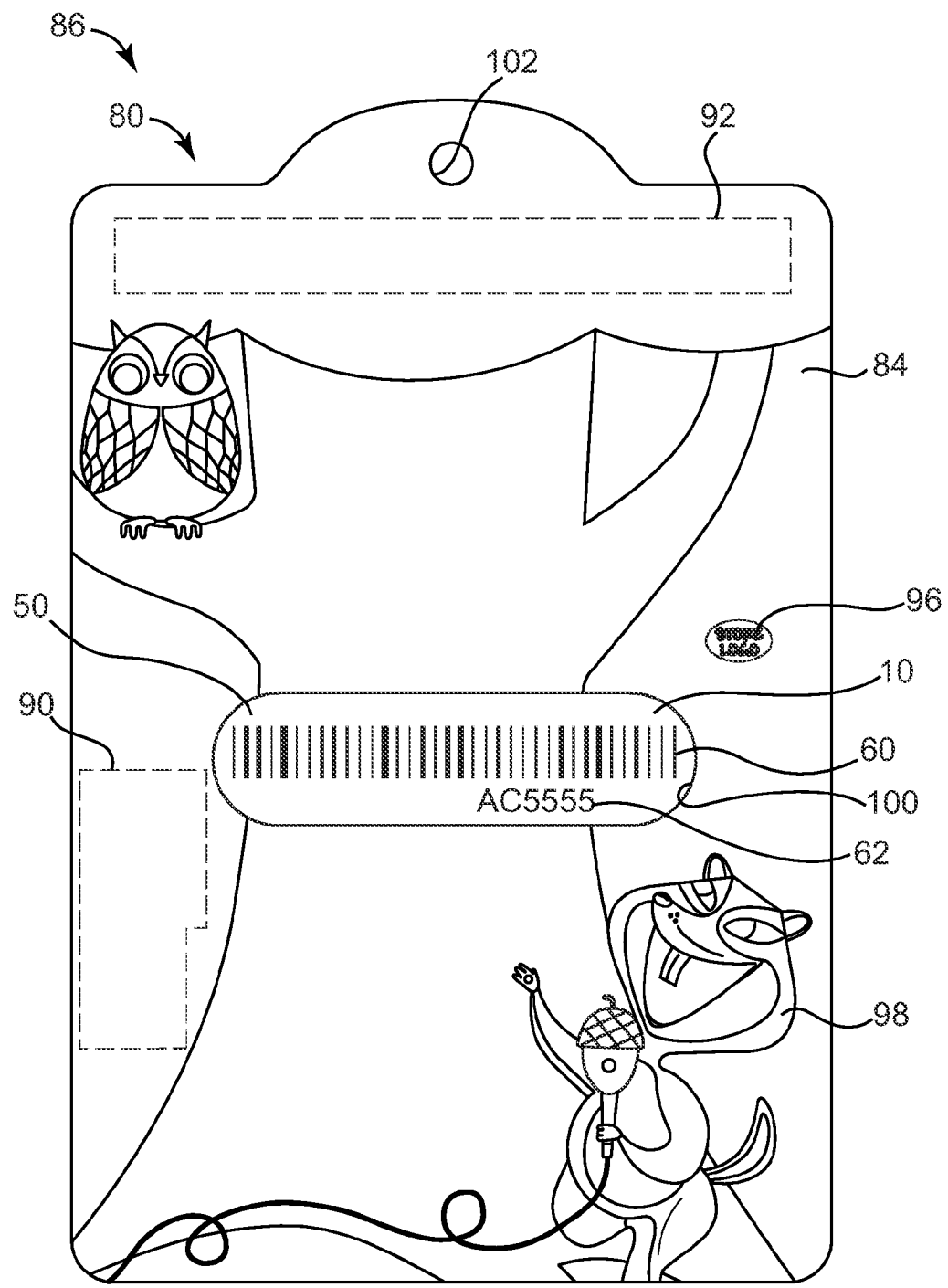
FIG. 11 is a rear view illustrating a transaction product assembly including the backer of FIG. 10 and the transaction product of FIG. 1, according to one embodiment of the present invention.

FIGS. 10 and 11 illustrate a carrier or backer 80 supporting transaction product 10 (FIGS. 1 and 3-8). Backer 80 comprises a single layer or multiple layers of paper or plastic material, for example, generally in the form of a relatively stiff but bendable/flexible card. Use of other materials is also contemplated. As such, backer 80 defines a first or front surface 82 (FIG. 10) and a second or rear surface 84 (FIG. 11). Transaction product 10, which is generally represented in phantom lines in FIG. 10 for illustrative purposes (i.e., to allow for full viewing of front surface 82), is readily releasably attached to backer 80, for example, by adhesive, blister packaging, overlying skinning material or the like, such that transaction product 10 with backer 80 collectively define a transaction product assembly 86 (FIG. 11).

Backer 80 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 82 and 84. In one example, the indicia include one or more of redemption indicia generally indicated with a dashed box at 90, instructional indicia generally indicated with a dashed box at 92, message field indicia 94, brand indicia 96, decorative indicia 98, etc.

Redemption indicia 90 indicate that transaction product 10 is redeemable for the purchase of goods and/or services and that upon use, a value of the purchased goods and/or services will be deducted from the financial account or record linked to transaction product 10. In one embodiment, redemption indicia 90 include phrases such as "<NAME OF STORE> Gift-Card" and "This GiftCard is redeemable for merchandise or services at any of our stores or at our website," and/or provides help or phone line information in case of a lost, stolen or damaged transaction product 10, etc.

Instructional indicia 92 include any indicia generally referring to how transaction product 10 can be used for purposes other than value redemption. For example, indicia 92 may instruct the bearer on how to coupled transaction product 10 with a corresponding computing device 12, how to access data stored to memory 22 of transaction product 10, how to store data to memory 22 of transaction product 10, etc. Other instructional indicia 92 are also contemplated.

In one example, message field indicia 94 include "to," "from" and "amount" fields configured to be written to by the bearer of transaction product assembly 86 prior to presenting transaction product assembly 86 to a recipient. As such, message field indicia 94 facilitate the consumer in preparing transaction product assembly 86 for gifting to a recipient.

Brand indicia 96 identify a store, brand, department, etc. and/or services associated with transaction product 10. Any decorative indicia 98, which may be similar to or coordinate with indicia of transaction product 10, may also be included on backer 80. In one embodiment, decorative indicia 98 coordinate or otherwise promote a media product associated with transaction product 10. For example, decorative indicia 98 may include a name of the media product, a depiction of a character from the media product, a depiction of a scene readily identifiable as a scent from the media product, a quote from the media product, etc.

Any of indicia 90, 92, 94, 96, 98 or other indicia optionally may appear anywhere on backer 80 or transaction product 10. Additional information besides that specifically described and illustrated herein may also be included.

In one embodiment, backer 80 defines a window or opening 100 for displaying account identifier 60 of transaction product 10 as illustrated in FIG. 11. As previously described, account identifier 60 is adapted for accessing an account or record associated with transaction product 10 for activating, loading or debiting value from the account or record. Accordingly, in one embodiment, opening 100 allows access to account identifier 60 to activate and/or load transaction product 10 without removing transaction product 10 from backer 80.

In one embodiment, backer 80 defines a hanging aperture 102 configured to receive a support arm or hook, such that transaction product assembly 86 can be hung from a rail or rack within the retail setting or elsewhere to facilitate display of transaction product assembly 86. According to one embodiment, FIG. 11 illustrates surfaces of backer 800 that will be supported on a rack or other fixture while FIG. 10 illustrates surfaces of backer 80 that will be visible to a consumer of a retail store who is considering the purchase of transaction product assembly 86. Other backers, such as foldable backers (not shown), can be used with various sizes and shapes of transaction products 10.

Figure 12:
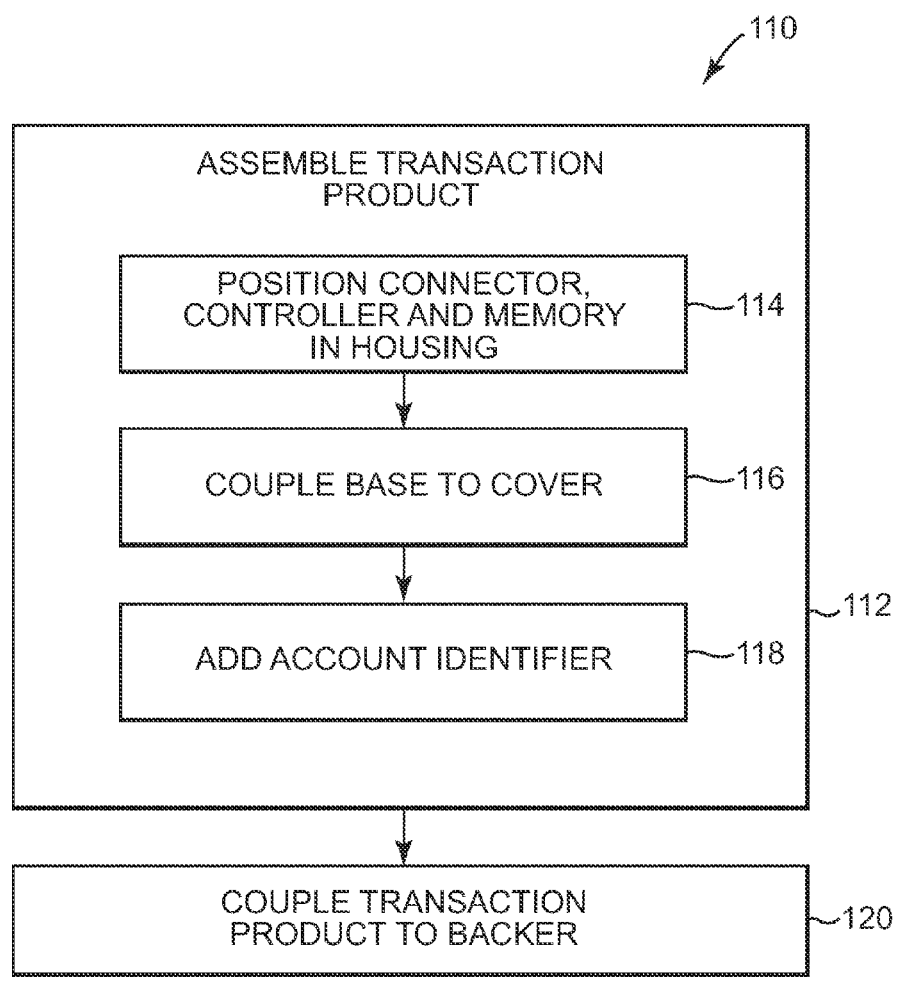
FIG. 12 is a flow chart illustrating a method of assembling a transaction product assembly, according to one embodiment of the present invention.

FIG. 12 is a flow chart illustrating one embodiment of a method 110 of assembling transaction product assembly 86. Additionally referring to FIGS. 1 and 9-11, at 112, transaction product 10 is assembled. More specifically, assembling transaction product 10 at 112 includes positioning at least controller 20 and memory 22 and, in one embodiment, electrical connector 16, within housing 14, for example, between base 24 and cover 26 at 114. In one embodiment, electrical connector 16 is coupled with controller 20 via communication link 36, but is configured to be positioned at least partially outside of housing 14.

Subsequently, at 116, base 24 is coupled with cover 26. More specifically, cover 26 is positioned over base 24 such that major surfaces 32 and 50 are substantially parallel to one another. As cover 26 is moved toward base 24 (or vice versa), communication link 36 is moved through opening 44 of cover 26 to extend through cover 26. In one embodiment, where opening 44 is relatively small, communication link 36 is positioned to extend through opening 44 and electrical connector 16 is subsequently coupled with communication link 36 opposite controller 20. Cover 26 is further moved to contact base 24 and be coupled thereto. In coupling base 24 to cover 26, adhesive, attachment devices, etc. may be used to increase the integrity of the coupling.

At 118, account identifier 60 is added to transaction product 10 in cases where account identifier 60 was not otherwise formed or added to base 24 and/or cover 26 at a previous step or enclosed between base 24 and cover 26 during coupling at 116. For example, at 118, account identifier 60 may be printed or otherwise applied to one or both of major surface 32 and major surface 50 after coupling base 24 to cover 26 at 116.

At 120, the assembled transaction product 10 is coupled with backer 80 to form transaction product assembly 86 (FIG. 11). In one example, transaction product 10 is coupled to front surface 82 of backer 80 in a selectively releasable manner (e.g., with adhesive, shrink wrap, clam shell or skinning material). In one embodiment, once transaction product 10 is coupled with backer 80, account identifier 60 of transaction product 10 is viewable through opening 100 of backer 80 as illustrated in FIG. 11. Following assembly at 110, transaction product assembly 86 is ready for retail or other display for sale to potential consumers.

Figure 13:
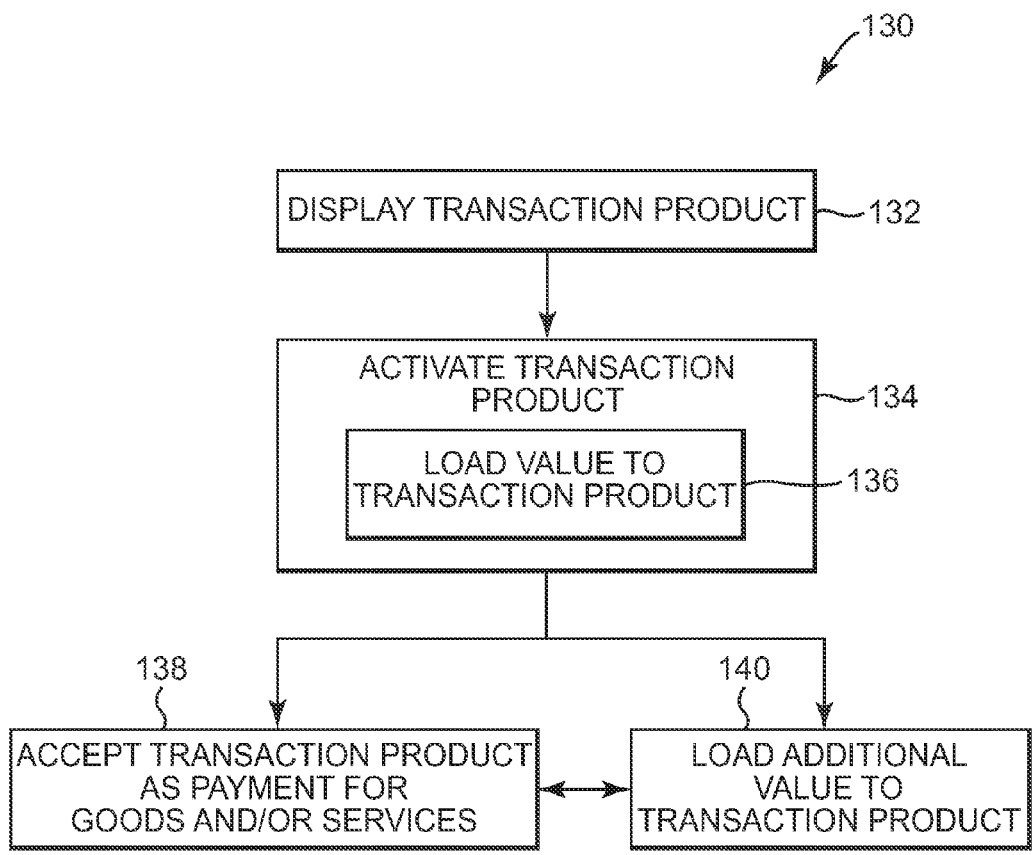
FIG. 13 is a flow chart illustrating a method of providing a transaction product for sale to and for use by consumers, according to one embodiment of the present invention.

FIG. 13 is a flow chart illustrating one embodiment of a method 130 of providing transaction product 10 for sale to and for use by consumers. At 132, transaction product 10 is displayed to potential consumers. For example, transaction product assembly 86, which includes transaction product 10, is placed on or hung from a rack, shelf or similar device to display transaction product assembly 86 in a retail setting such that transaction product 10 is visible to potential consumers. In one embodiment, transaction product 10 is displayed without backer 80 and/or a depiction of transaction product 10 is placed on a web site for viewing and purchase by potential consumers.

At 134, a consumer, who has decided to purchase transaction product 10, presents transaction product assembly 86, or at least transaction product 10, to a retail store employee, retail store kiosk or other person or device to scan or otherwise read account identifier 60 of transaction product 10 (e.g., through opening 100 in backer 80) to access the account or record linked to account identifier 60. Upon accessing the account or record, value is added to the account or record at 136. Thus, transaction product 10 is activated and loaded. In one embodiment, wherein a value is associated with transaction product 10 prior to purchase and activation of transaction product 10, operation 136 may be eliminated and activating transaction product 10 at 134 serves to unlock the account or record or otherwise make the predetermined value in the account or record available to a bearer of transaction product 10.

Once transaction product 10 is activated and/or loaded, transaction product 10 can be used by the consumer or any other bearer of transaction product 10 toward the purchase or use of goods and/or services at the retail store or other affiliated retail setting or web site. In one embodiment, where transaction product 10 is displayed on a web site at 132, then, at 134, transaction product 10 may be activated in any suitable method and may be completed without machine scanning of account identifier 60. In one embodiment, transaction product 10 is activated and/or loaded remotely via a telephone or the Internet.

At 138, the retail store or other affiliated retail setting, web site, etc. accepts transaction product 10 as payment toward the purchase or use of goods and/or services made by the current bearer of transaction product 10. More specifically, in one embodiment, the value currently loaded on transaction product 10 is applied toward the purchase of goods and/or services, toward the use of calling minutes, etc. At 140, additional value is optionally loaded on transaction product 10 at a point-of-sale terminal, kiosk, other area of the retail store or related setting or via a web site or by telephone. Upon accepting transaction product 10 as payment at 138, the retail store or related setting can subsequently perform either operation 138 again or operation 140 as requested by a current bearer of transaction product 10. Similarly, upon loading additional value to transaction product 10 at 140, the retail store or related setting can subsequently perform either operation 140 again or operation 138. In one example, the ability to accept transaction product 10 as payment for or toward use of goods and/or services is limited by whether the account or record associated with transaction product 10 has any value at the time of attempted redemption.

Figure 14:
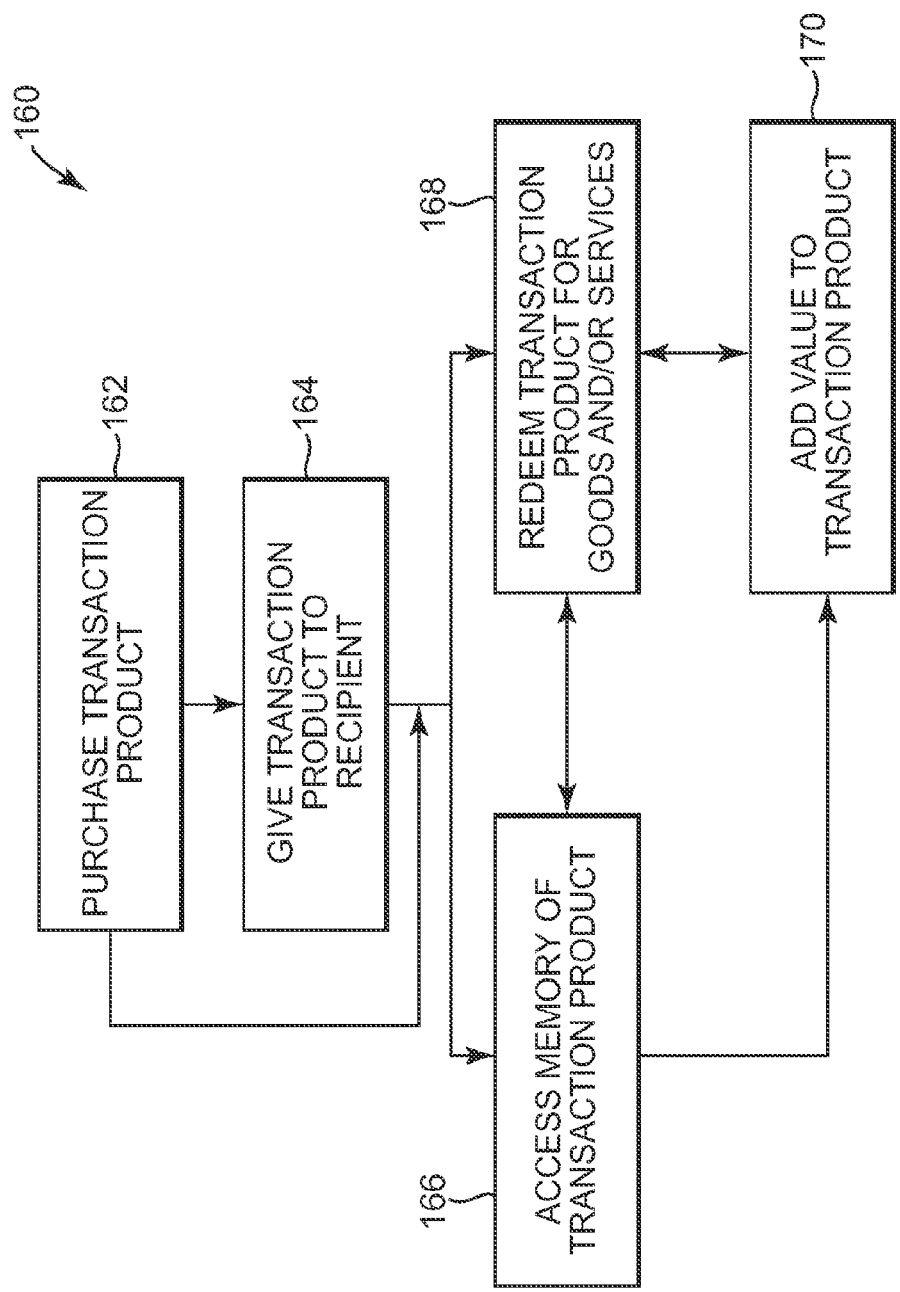
FIG. 14 is a flow chart illustrating a method of using a transaction product, according to one embodiment of the present invention.
Figures 17, 18:
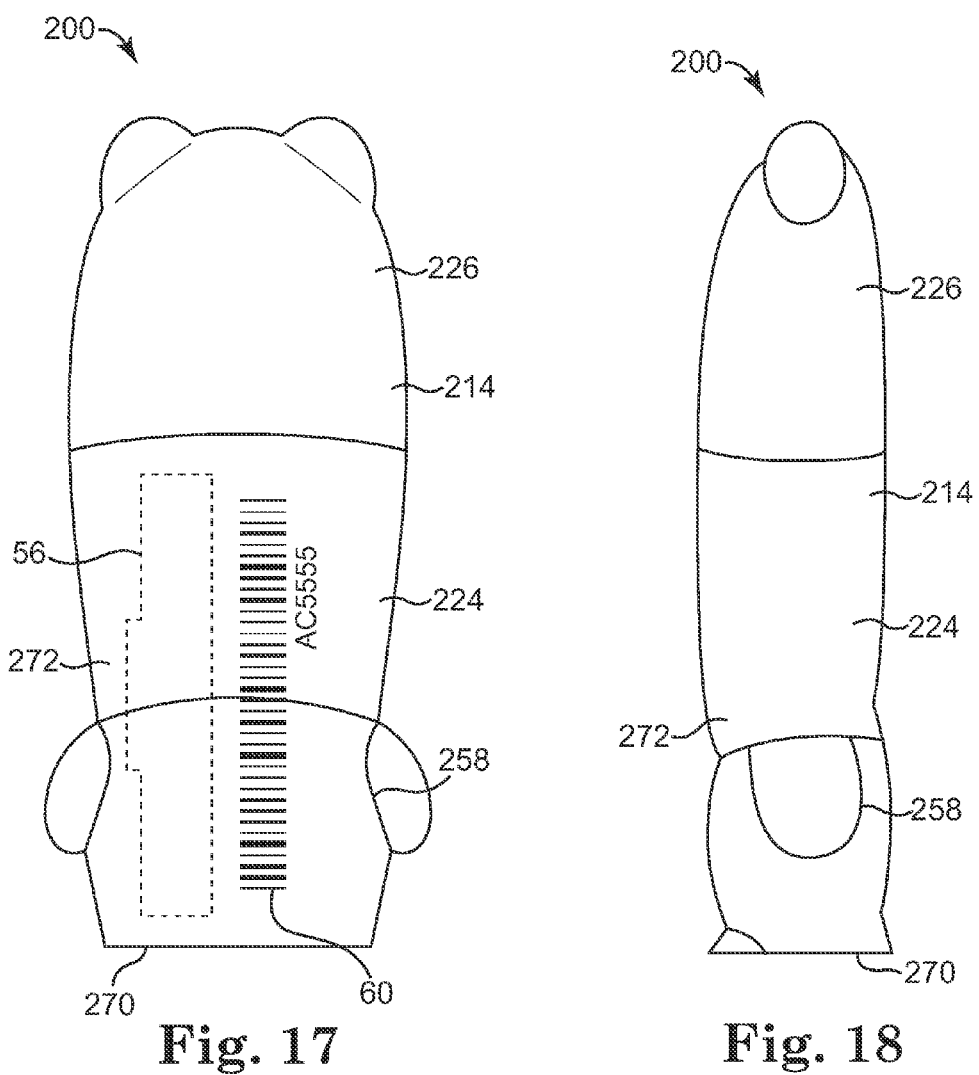
FIG. 17 is a rear view illustrating the transaction product of FIG. 1.
FIG. 18 is a right side view illustrating the transaction product of FIG. 1, the left side view being a mirror image thereof.

FIG. 14 is a flow chart illustrating one embodiment of a method 160 of using transaction product 10. At 162, a potential consumer of transaction product 10, which is displayed in a retail store or viewed on a web site, decides to and does purchase transaction product 10 from the retail store or web site setting. Transaction product 10 can be displayed and purchased alone or as part of transaction product assembly 86. Upon purchasing transaction product 10, a retail store employee, retail store kiosk or other person scans account identifier 60 to activate and/or load value onto transaction product 10. In one embodiment, such as where transaction product 10 is purchased at 162 via a web site, actual scanning of account identifier 60 may be eliminated.

At 164, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, bridal shower, etc. as party favors or gifts. As an alternative, the consumer can keep transaction product 10 for his or her own use thereby eliminating operation 164.

At 166, the consumer or recipient, whoever is in current ownership or otherwise is the current bearer of transaction product 10, uses transaction product 10 for reasons unrelated to its stored-value or transactional functionality. More specifically, the bearer uses transaction product 10 to access electronic data stored to memory 22 and/or to store new data to memory 22. More specifically, additionally referring to FIG. 2, the bearer releases electrical connector 16 from pocket 30, for example, by interfacing with release button 48, and removes electrical connector 16 and second portion 38 of communication link 36 from pocket 30. Electrical connector 16 is moved away from housing 14 and is plugged into socket 18 of a corresponding computing device 12.

Once coupled with computing device 12, the bearer uses computing device 12 to access data previously stored to memory 22 and/or to store new data to memory 22 of transaction product 10. In one embodiment, when computing device 12 accesses memory 22, light 68 of transaction product 10 is illuminated to inform the bearer that memory 22 is being accessed. Once a bearer is finished accessing memory 22, at least for the time being, transaction product 10 is uncoupled from computing device 12 (i.e., electrical connector 16 is removed from socket 18) until a later time and/or subsequent coupling with the same or a different computing device 12.

In one example, where memory 22 includes pre-stored data relating to the media product associated with transaction product 10, when the bearer accesses memory 22, the bearer is able to listen to music, view media clips, play interactive games, use web links, review listings of associated products, etc. stored to memory 22 that promote the media product. As such, transaction product 10 also serves as a promotion vehicle promoting the media product, any pre-stored data 28 and/or any products or services associated therewith.

At 168, the current bearer of transaction product 10 redeems transaction product 10 for goods and/or services from the retail store or web site. Operation 168 may occur before, after or before and after operation 166. At 170, the current bearer of transaction product 10 optionally adds value to transaction product 10 or, more particularly, to the account or record associated with transaction product 10, at the retail store, over the Internet or via telephone. Upon accessing memory 22 of transaction product 10 at 166, redeeming transaction product 10 at 168 or adding value to transaction product 10 at 170, the current bearer of transaction product 10 subsequently can perform any of operations 166, 168 or 170 as desired. In one embodiment, the ability of the current bearer to repeat redeeming transaction product 10 at 168 is limited by whether the account or record associated with transaction product 10 has any value at the time of attempted redemption.

Although primarily described above as occurring at single retail store or web site, in one embodiment, purchasing transaction product 10 at 162, redeeming transaction product 10 at 168 and adding value to transaction product 10 at 170, can each be performed at any one of a number of stores adapted to accept transaction product 10 or over the Internet. In one example, the number of stores are each a part of a chain of similarly branded stores. In one example, the number of stores includes at least one web site and/or at least one conventional brick and mortar store.

FIGS. 15-18 illustrate one embodiment of a transaction product 200. Like transaction product 10 (e.g., FIG. 1), transaction product 200 is configured both to store electronic data from computing device 12 (FIG. 2) and to be associated with an account or record having a value, which can be applied toward the purchase and/or use of goods and/or services. Transaction product 200 includes a housing 214 enclosing controller 20 and memory 22. An electrical connector 236 (FIG. 16), which is similar to electrical connector 16, is coupled with controller 20 and is selectively enclosed within housing 214.

For example, in one embodiment, housing 214 includes a first member or base 224 and a second member or cover 226 selectively coupled to one another in any suitable manner.

Base 224 independently encloses controller 20 and memory 22 and electrical connector 236 outwardly extends from base 224. Electrical connector 236 is configured to be selectively coupled with computing device 12 via socket 18 (FIG. 2) such that base 224 with controller 20, memory 22 and electrical connector 236 function similar to a flash drive or other removable storage component selectively accessible by computing device 12 (e.g., similar to the data storage functionality described above with respect to transaction product 10).

Cover 226 is configured to be selectively coupled with base 224 to enclose electrical connector 236 therebetween. In one example, cover 226 defines an internal recess or pocket 230 (generally indicated with hidden lines in FIG. 16) sized to receive electrical connector 236 when cover 226 is coupled with base 224. In this manner, transaction product 10 or, more particularly, housing 14 transitions from a first or storage position (FIGS. 15, 17 and 18) to a second or use position (FIG. 16). While in the storage position, electrical connector 236 is protected from environmental contaminates such as dirt, dust, etc. that could interfere with subsequent use of electrical connector 236. While in the use position, electrical connector 236 is accessible and can be relatively easily coupled with socket 18 of any suitable computing device (FIG. 2).

Like transaction product 10, transaction product 200 includes account identifier 60 linking transaction product 200 to an account or record. Transaction product 200 may also include one or more of brand indicia 54, redemption indicia 56 and decorative indicia 258, which are similar to decorative indicia 58 described above with respect to transaction product 10.

In one embodiment, housing 214 is shaped in a three-dimensional manner mimicking a shape of a fictional or non-fictional character. For example, housing 214 may be shaped similar to a fictional character from a media product associated with transaction product 200 and is configured to stand upright from a support surface (not shown). For instance, housing 214, which is shaped to generally define feet, legs, a torso, arms and a head of character wherein a bottom surface 270 of housing 214 is adjacent the feet of the character, is substantially planar and is configured to interface with the support surface such that housing 214 (and therefore, the character) stands upright from the support surface.

Decorative indicia 258 are included on external surfaces 272 of housing 214 and are configured to further define the character. For example, decorative indicia 258 may further define or separate the feet, legs, torso, arms and/or head of the character as well as any clothing, facial or other features to make the depicted character readily identifiable to users, potential consumers and other observers of transaction product 200. In one embodiment, the three-dimensional depiction of the character by transaction product 200 further promotes the sale and use of transaction product 200 by consumers and/or recipients as well as the media product and associated data content associated therewith.

Transaction product 200 can be assembled, provided and used in a similar manner as described above with respect to transaction product 10 with only minor differences as will be apparent to those of skill in the art upon reading the current application. Furthermore, transaction products differing from transaction products 10 and 200 described above but still falling within the scope of the present invention will also be apparent to those of skill in the art upon reading this application.

Stored-value cards and other transaction products come in many forms, according to embodiments of the invention. The gift card, like other stored-value cards, can be "recharged" or "reloaded" at the direction of the original consumer, the gift recipient or third party. The term "loading on" or "loaded on" herein should be interpreted to include adding to the balance of an account or record associated with a stored-value card. The balance associated with a stored-value card declines as the card is used, encouraging repeat visits. The card remains in the user's purse or wallet, serving as an advertisement or reminder to revisit the associated merchant. Gift cards, according to an embodiment of the invention, provide a number of advantages to both the consumer and the merchant. Other transaction products according to embodiments of the invention include loyalty cards, merchandise return cards, electronic gift certificates, employee cards, frequency cards, pre-paid cards and other types of cards associated with or representing purchasing power or monetary value, for example.

Although the invention has been described to particular embodiments, such embodiments are for illustrative purposes only and should not be considered to limit the invention. Various alternatives and modifications within the scope of the invention in its various embodiments will be apparent to those with ordinary skill in the art.

What is claimed is:

1. A transaction product comprising:
    a memory;
    a housing enclosing the memory;
    an electrical connector securely electrically coupled with the memory and configured to be selectively received by a socket of a computing device such that the computing device can access the memory via the electrical connector; and
    an account identifier linking the transaction product to an account or record, the account identifier being machine readable by a point-of-sale terminal such that value can be added to or deducted from the account or record using the account identifier;
    wherein the housing includes indicia relating to a media product, and the memory includes pre-stored data relating to the media product.

2. The transaction product of claim 1, wherein the account identifier includes at least one of a bar code, a magnetic strip, an electronic device and a radio frequency identification device.

3. The transaction product of claim 1, further comprising a controller enclosed within the housing, wherein the controller is electrically coupled to and configured to access the memory, and the electrical connector is securely electrically coupled with the memory via the controller in a manner configured to provide access to the memory via the electrical connector and the controller.

4. The transaction product of claim 3, wherein the housing includes a base and a cover coupled to one another to enclose the controller and the memory therebetween.

5. The transaction product of claim 3, wherein the controller is coupled to the electrical connector with a communication link, and the electrical connector and a portion of the communication link extend outside of the housing.

6. The transaction product of claim 1, wherein the pre-stored data include one or more of a game, a video clip, a music file, a web site link and a listing of other products associated with the media product.

7. The transaction product of claim 1, wherein the housing has a three-dimensional shape mimicking a character associated with the media product.

8. The transaction product of claim 1, wherein the media product is one of a television show, a movie and a book.

9. The transaction product of claim 1, wherein the housing is sized similar to a credit card.

10. The transaction product of claim 1, wherein the housing includes a pocket open to an external surface of the housing, and the electrical connector is selectively received and maintained within the pocket.

11. The transaction product of claim 10, wherein the memory is coupled to the electrical connector at least in part with a communication link, and a portion of the communication link is selectively received and maintained within the pocket.

12. The transaction product of claim 11, wherein:
the pocket defines a first end and a second end opposite the first end,
the housing defines an opening at the first end of the pocket providing access into the housing,
the communication link extends from within the housing, out the opening, and to the electrical connector,
the communication link is pliable such that the communication link is rotatable about the opening to allow the electrical connector to transition from a first position within the pocket to a second position extending away from the housing, and
both the electrical connector and a portion of the communication link extending from the opening are configured to be selectively received and maintained within the pocket.

13. The transaction product of claim 12, wherein:
the pocket defines a first portion and a second portion,
the opening is defined in the second portion of the pocket opposite the first portion,
the second portion is sized to receive the portion of the communication link extending from the opening,
the first portion is sized to receive the electrical connector, and
the first portion is sized larger in at least one dimension than the second portion.

14. The transaction product of claim 1, wherein when the electrical connector is in a storage position, the electrical connector is selectively embedded within the housing, and the transaction product comprises a button, wherein when a bearer of the transaction product interfaces with the button, the electrical connector is released from the storage position.

15. The transaction product of claim 1, wherein the housing includes a first member and a second member, the first member enclosing the memory, the electrical connector extending outwardly from the first member, and the second member being selectively coupled with the first member to enclose the electrical connector between the first member and the second member.

16. The transaction product of claim 1, wherein the electrical connector is a universal serial bus (USB) connector.

17. The transaction product of claim 1, wherein the memory includes a solid state memory.

18. The transaction product of claim 1, wherein the memory includes the pre-stored data before the transaction product is activated for use such that value can be added to or deducted from the account.

19. A transaction product comprising:
a memory;
a housing enclosing the memory;
an electrical connector securely electrically coupled with the memory and configured to be selectively received by a socket of a computing device such that the computing device can access the memory via the electrical connector; and
an account identifier linking the transaction product to an account or record, the account identifier being machine readable by a point-of-sale terminal such that value can be added to or deducted from the account or record using the account identifier;
wherein:
the housing includes a pocket open to an external surface of the housing, and the electrical connector is selectively received and maintained within the pocket,
the memory is coupled to the electrical connector at least in part with a communication link,
a portion of the communication link is selectively received and maintained within the pocket, and
the housing defines an opening adjacent the pocket, the communication link extends through the opening and is coupled to the electrical connector opposite the opening, wherein the communication link and the electrical connector are rotatable about the opening relative to the housing.

20. A stored-value card, comprising:
means for linking the stored-value card to an account or record;
means for visually associating the stored-value card with a media product;
data associated with the media product;
means for storing the data associated with the media product;
means for enclosing the means for storing data;
means for selectively coupling the stored-value card with a personal computer, wherein the means for selectively coupling are configured to extend from at least a portion of the means for enclosing and are in electrical communication with the means for storing data such that the personal computer can communicate with the means for storing data via the means for selectively coupling.

21. The stored-value card of claim 20, wherein the data include one or more of a game, a video clip, a music file, a web site link and a listing of other products associated with the media product.

22. The stored-value card of claim 20, wherein the means for storing and the means for selectively coupling are coupled to one another at least in part by a communication cable defining a first portion positioned inside the means for enclosing and a second portion positioned outside the means for enclosing, the second portion being coupled with the means for selectively coupling, wherein the communication cable and the means for selectively coupling are each movable relative to the housing.

23. The stored-value card of claim 20, wherein:
the means for enclosing defines an external recess defining an opening at one end, the opening extending from the external recess into the means for enclosing,
the means for selectively coupling includes a pliable link and a electrical connector configured to be selectively coupled with the personal computer,
the pliable link extends from within the means for enclosing and is in communication with the means for storing the data, and
the external recess is sized and shaped to selectively receive the pliable link and the electrical connector during periods of non-communication with the personal computer.

24. A method of encouraging purchase and facilitating use of a transaction product, the method comprising:
displaying the transaction product including a housing, a standardized electrical connector, which is at least partially maintained within a portion of the housing and is configured to be selectively coupled with a computing device, and a memory storing data associated with a media product, wherein the transaction product includes an activation area linking the transaction product to an account or record, and displaying the transaction product includes promoting the media product associated with the data; and activating the transaction product to permit deductions from the account or record including machine reading the activation area to determine the account or record linked to the transaction product.

25. The method of claim 24, further comprising receiving the transaction product as payment for goods or services, at least a portion of a value of the goods or services being deducted from the account or record.

26. The method of claim 24, wherein the memory includes a solid state memory.

27. A method of forming a stored-value product, the method comprising:

placing a controller and memory coupled with the controller within an enclosure;

permanently coupling the controller with an electrical connector such that the electrical connector extends out of at least a portion of the enclosure, and the electrical connector is configured to be selectively received by a socket of a personal computer, wherein the personal computer can access the memory via the electrical connector and the controller to one or more of read data from and write data to the memory when the electrical connector is received by the socket;

storing electronic data to the memory, wherein:
　the electronic data is readily associated with a media product,
　the media product is one of a movie, a television show, and a book, and
　the enclosure is visually associated with the media product; and associating an account identifier with the enclosure, the account identifier linking the stored-value product to an account or record having an associated value.

28. The method of claim 27, further comprising at least partially positioning the electrical connector within the enclosure for storage.

29. The method of claim 27, wherein the enclosure includes at least one of a shape visually associating the enclosure with the media product and visual indicia visually associating the enclosure with the media product.

* * * * *